United States Patent
Aabye et al.

(10) Patent No.: US 10,182,062 B2
(45) Date of Patent: Jan. 15, 2019

(54) SOFTWARE TAMPERING DETECTION AND REPORTING PROCESS

(71) Applicant: Visa International Service Association, San Francisco, CA (US)

(72) Inventors: Christian Aabye, Foster City, CA (US); Robert Youdale, Burlingame, CA (US); Mohamed Nosseir, Castro Valley, CA (US); Brijendra Singh, Cupertino, CA (US); Paul Hilliar, Bristol (GB)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 34 days.

(21) Appl. No.: 14/979,082

(22) Filed: Dec. 22, 2015

(65) Prior Publication Data
US 2016/0182543 A1    Jun. 23, 2016

Related U.S. Application Data

(60) Provisional application No. 62/095,310, filed on Dec. 22, 2014.

(51) Int. Cl.
*G06F 7/04* (2006.01)
*H04L 29/06* (2006.01)
(Continued)

(52) U.S. Cl.
CPC .......... *H04L 63/1416* (2013.01); *G06F 21/14* (2013.01); *G06F 21/88* (2013.01); *H04W 12/12* (2013.01); *H04L 63/18* (2013.01)

(58) Field of Classification Search
CPC .......... G06F 21/14; G06F 21/36; G06F 21/42; G06F 21/88; H04L 63/1416; H04L 63/18;
(Continued)

(56) References Cited

U.S. PATENT DOCUMENTS 6,480,096 B1 * 11/2002 Gutman ............ G08B 13/1418
                                                              340/5.31
7,287,166 B1    10/2007 Chang et al.
(Continued)

FOREIGN PATENT DOCUMENTS

WO    2010/099352 A1    9/2010
WO    2013/109932 A1    7/2013

OTHER PUBLICATIONS

International Search Report and Written Opinion dated Apr. 14, 2016 in PCT/US2015/067405, 14 pages.
(Continued)

*Primary Examiner* — Abiy Getachew
(74) *Attorney, Agent, or Firm* — Kilpatrick Townsend Stockton LLP

(57) ABSTRACT

A method is disclosed. The method includes determining, by a security software application on a communication device, that the communication device has been accessed by an unauthorized user. The communication device is configured to communicate with a telecommunications network over the air through a first communication channel. The method also includes generating, by the communication device, security notification data and providing the security notification data or a derivative of the security notification data to a host computer via a second communication channel.

21 Claims, 9 Drawing Sheets

(51) Int. Cl.
*G06F 21/14* (2013.01)
*H04W 12/12* (2009.01)
*G06F 21/88* (2013.01)

(58) Field of Classification Search
CPC ..... H04L 63/083; H04L 63/0838; H04L 9/08; H04L 9/32; H04L 9/3228; H04L 9/3236; H04W 12/12; H04W 12/06; G06Q 20/3274; G06Q 20/385
See application file for complete search history.

(56) References Cited

U.S. PATENT DOCUMENTS

| | | |
|---|---|---|
| 8,850,568 B2 | 9/2014 | Shirlen et al. |
| 9,735,966 B2 * | 8/2017 | Davies ................ H04L 63/08 |
| 2001/0037450 A1 * | 11/2001 | Metlitski ............ G06F 12/1408 |
| | | 713/152 |
| 2005/0262557 A1 | 11/2005 | Fellenstein et al. |
| 2007/0050840 A1 | 3/2007 | Grandcolas et al. |
| 2007/0192864 A1 | 8/2007 | Bryant et al. |
| 2015/0052603 A1 | 2/2015 | Morgan |
| 2016/0275480 A1 | 9/2016 | Sanaboyina et al. |

OTHER PUBLICATIONS

"Extended European Search Report", for EP Application No. EP15874311.2 dated Jun. 6, 2018, 8 pages.

* cited by examiner

SOFTWARE TAMPERING DETECTION AND REPORTING PROCESS

CROSS-REFERENCE TO RELATED APPLICATION

This application claims the benefit of U.S. Provisional Application No. 62/095,310, filed Dec. 22, 2014, which is herein incorporated by reference in its entirety.

BACKGROUND

Mobile application providers face a threat that traditional Web applications do not face. An attacker can de-compile a mobile application to reveal the entire source code.

In some cases, binary protections can be used to obfuscate source code and elements can be used to identify attacks on source code. Such elements are provided by Arxan Technologies, Inc. When an element identifies an attack on the source code, the element can notify a remote server over the air (e.g., over the cellular network) that an attack has taken place. While this technology is useful, attackers can shut down the data connection over a cellular network to the phone thereby preventing the report of attacks.

Embodiments of the invention address this and other problems, individually and collectively.

BRIEF SUMMARY

Embodiments of the invention are directed to software tampering detection processes and systems.

One embodiment of the invention is directed to a method comprising (a) determining, by a security software application on a communication device, that the communication device has been accessed by an unauthorized user, wherein the communication device is configured to communicate with a telecommunications network over the air through a first communication channel; (b) generating, by the communication device, security notification data in response to step (a); and (c) providing, by the communication device, the security notification data or a derivative of the security notification data to a host computer via a second communication channel.

Another embodiment of the invention is directed to a communication device comprising: a processor; and a computer readable medium coupled to the processor, the computer readable medium comprising code, executable by the processor to implement a method comprising: (a) determining that the communication device has been accessed by an unauthorized user, wherein the communication device is configured to communicate with a telecommunications network over the air through a first communication channel; (b) generating security notification data in response to step (a); and (c) providing the security notification data or a derivative of the security notification data to a host computer via a second communication channel.

These and other embodiments of the invention are described in further detail below.

DETAILED DESCRIPTION

Figure 1:
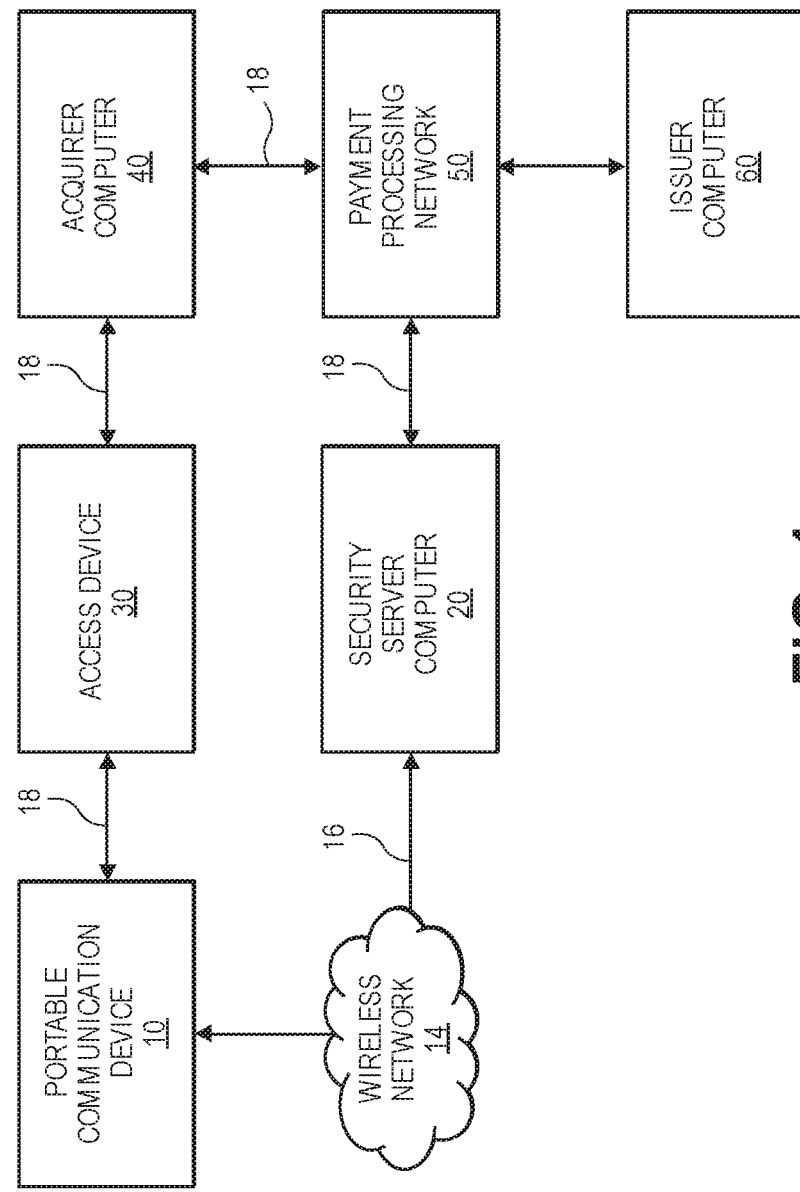
FIG. 1 shows a block diagram of a system according to an embodiment of the invention.

Prior to discussing the details of some embodiments of the present invention, description of some terms may be helpful in understanding the various embodiments.

A "communication device" may be a device that can communicate and that is stationary or portable.

A "portable communication device" may be a portable device that may be transported and operated by a user, and may include one or more electronic components (e.g., an integrated chip). A portable communication device may provide remote communication capabilities to a network. The portable communication device can be configured to transmit and receive data or communications to and from other devices. A portable communication device may be in the form of a mobile device such as a mobile phone (e.g., smart phone, cellular phone, etc.), tablets, portable media player, personal digital assistant devices (PDAs), wearable computing device (e.g., watch), electronic reader device, etc., or in the form of a card (e.g., smart card) or a fob, vehicles such as automobiles, etc. Examples of portable communication devices may also include portable computing devices (e.g., laptops, netbooks, ultrabooks, etc.).

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "issuer" may typically refer to a business entity (e.g., a bank) that maintains an account for a user. For example, an issuer may be the bank that issues a credit card to a cardholder. An issuer may also issue account parameters associated with the account to a portable communication device. An issuer may be associated with a host system that performs some or all of the functions of the issuer on behalf of the issuer.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers.

An "access device" may be any suitable device for communicating with a merchant computer or payment processing network, and for interacting with a payment device, a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization. As noted above, in some embodiments, a payment processing network may generate or forward the authorization response message to the merchant.

The term "authentication" and its derivatives may refer to a process by which the credential of an endpoint (including but not limited to applications, people, devices, processes, and systems) can be verified to ensure that the endpoint is who it is declared to be.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

A "token" may include a substitute identifier for some information. For example, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "real account identifier" may include an original account identifier associated with a payment account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

"Account parameters" may refer to information relating to an account that can be used to conduct a transaction on the account. Examples of account parameters may include information that can be used to identify an account of the user (e.g., real account identifier, alternate account identifier, token, etc.), data or information relating to the status of the account, one or more keys that are used to generate cryptographic information, data or information relating to the one or more keys, etc. An account parameter can be semi-static or dynamic. A dynamic account parameter may be an account parameter that has a limited lifespan, and which once expired, can no longer be used to conduct a transaction until the account parameter is replenished, refreshed, or renewed. A dynamic account parameter may be replenished frequently during the lifetime of an account. A semi-static account parameter may be an account parameter that has an extended lifespan that is longer than a dynamic account parameter, and can be replenished less frequently than a dynamic account parameter or not at all during the lifetime of the account.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "cryptogram" may refer to an encrypted representation of some information. A cryptogram can be used by a recipient to determine if the generator of the cryptogram is in possession of a proper key, for example, by encrypting the underlying information with a valid key, and comparing the result to the received cryptogram. The cryptogram is also used to verify that the data received has not been tampered with or modified. If even a single bit of the data is changed, the cryptogram validation will fail.

A "limited-use threshold" may refer to a condition that limits the usage of a piece of information. A limited-use threshold may be exceeded or exhausted when the underlying condition is met. For example, a limited-use threshold may include a time-to-live that indicates an amount of time that a piece of information is valid for, and once that amount of time has elapsed, the limited-use threshold is exceeded or exhausted, and the piece of information may become invalid and may no longer be used. As another example, a limited-use threshold may include a number of times that a piece of information can be used, and once the piece of information has been used for that number of times, the limited-use threshold is exceeded or exhausted, and the piece of information may become invalid and may no longer be used.

A "payment processing network" may include a network that can process and route payment request messages. An exemplary payment processing network may include data processing subsystems, networks, and operations used to support and deliver authorization services, exception file services, transaction scoring services, and clearing and settlement services. An exemplary payment processing network may include VisaNet™. Payment processing networks such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

A "security element module" may be programmed to perform certain tasks (e.g., checksumming program code) and may operate together in a security application or program. Examples of security element modules are in FIG. 3B and are described herein. In one embodiment, a security element module is a security guard.

"Security notification data" may include any suitable information that can notify a party of a potential or actual security compromise on a communication device. Security notification data may be in any suitable form and may be of any suitable length. For example, security notification data may include one or more flags that indicate a potential or actual security compromise and what type of security compromise is expected or has occurred. Such flags can be, for example, a bit set to a certain value (e.g., a bit set to "1" instead of "0" may indicate a security compromise, and the position(s) of the "1" within a byte may indicate what type of security compromise). In one embodiment, the format of the security notification data may be proprietary to the developer of the security software application, such that the security notification data may be interpreted only by authorized parties, and not by unauthorized users.

A "derivative" of security notification data may include any data derived from security notification data. In some embodiments, a derivative of security notification data may be in the form of data that serves a different purpose, such as authentication of an individual or a device. In some embodiments, a derivative of security notification data may be a cryptogram.

In embodiments of the invention, information (a signal) regarding the alteration of software on a portable communication device (e.g., a phone has been hacked) may form security notification data. The security notification data may be present in or used to derive standard payment transaction data (i.e. into the data used in standard contactless payment transactions). For example, the security notification data may be used to derive a cryptogram (such as a CVV value) that is normally passed in typical credit and debit card transactions. In this way, a payment processor or issuer that receives the cryptogram can determine that the portable communication device has been compromised (e.g., hacked). Further, since the security notification data is embedded in standard payment transaction data, the entity that hacked the portable communication device will not know that any evidence of compromise has been transmitted to an external entity such as a payment processor or an issuer.

In embodiments of the invention, the security server computer and the payment processing network can use the security notification data to make transaction decisions; provide a report that a security element module on the portable communication device has been activated and that the attacker or customer attempted to make a contactless payment; report on which type of security element module was triggered; record these types of information regardless of whether the attacker/customer had data coverage; and black-list certain devices, throttle transactions, etc., using the security notification data.

FIG. 1 shows a system according to an embodiment of the invention. The system includes a remote security server computer 20 and a portable communication device 10 (e.g., a mobile phone) in communication with each other. The portable communication device 10 may be configured to communicate with a telecommunications network over the air through a first communication channel. The first communication channel may include a cellular phone network or WiFi, for example. The portable communication device 10 may interact with an access device 30 which may be operated by a merchant via a second communication channel. The access device 30 may be in communication with an acquirer computer 40, a payment processing network 50, and an issuer computer 60. The security server computer 20 may be communication with the payment processing network 50.

It is noted that the blocks illustrated in FIG. 1 are for illustration purposes, and that certain blocks can be combined or functions may be separated into other computational components in other embodiments of the invention. For example, in some embodiments, the security server computer 20 may be part of the payment processing network 50, and they need not exist as separate entities. This embodiment is described further herein with respect to FIG. 5B.

Any suitable number or types of communication networks may be present between the mobile phone 10 and the security server computer 20, as well as between any other suitable combination of entities in FIG. 1. A communications network may be any one and/or a combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

In FIG. 1, a first communication channel 16 is shown between the security server computer 20 and the portable communication device 10. The first communication channel 16 may include a wireless network 14.

Also in FIG. 1, a second communication channel 18 that is separate from the first communication channel 16 is shown. The second communication channel 18 may be formed by a communication path involving at least one or more of the portable communication device 10, the access device 20, the acquirer computer 40, the payment processing network 50, and the security server computer 20. Note that all of these entities need not be included in the second communication path 18. For example, the acquirer computer 40 may be omitted from the second communication path 18 in some embodiments of the invention. In order to perform a payment transaction, the second communication path 18 must be available. The first communication channel 16 need not be enabled at the time of payment, however.

Figure 2:
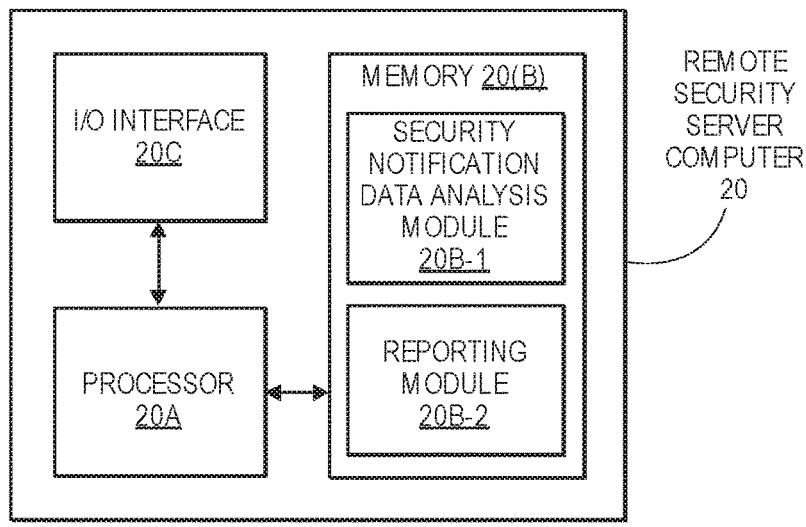
FIG. 2 is a block diagram illustrating some components of a remote security server computer according to an embodiment of the invention.

FIG. 2 shows a block diagram of some components in a security server computer 20 according to an embodiment of the invention. The security server computer 20 may include a processor 20A, which is operatively coupled to a memory 20B, and a wireless communications I/O interface 20C. The memory 20B may comprise a computer readable medium and may store a security notification data analysis module 20B-1 and a reporting module 20B-2.

The processor 20A can include a single-core processor, a plurality of single-core processors, a multi-core processor, a plurality of multi-core processors, or any other suitable combination of hardware configured to perform arithmetical, logical, and/or input/output operations of a computing device.

The memory 20B may comprise any suitable combination of memory devices (e.g., memory chips), that may utilize any suitable mechanism (e.g., electrical, optical, electro-magnetic, etc.) for data storage.

The security notification data analysis module 20B-1 may be stored as computer code on the memory 20B. The security notification data analysis module 20B-1 may, in conjunction with the processor 20A, cause the remote security server computer 20 to perform any suitable type of security data analysis. Examples of suitable security data analyses may include determining of applications or application logic code has been copied, determining if an application has been modified, determining if malicious code has been inserted into a device, and determining of license management systems and digital rights media controls have been circumvented.

The reporting module 20B-2 may, in conjunction with the processor 20A, cause the remote security server computer 20 to perform any suitable reporting functions. For example, reports of any communication device comprises to any suitable individuals. Such reports may be transmitted over the wireless communications network I/O interface 20C. Such reports may include any suitable content and may take the form of e-mails, voice messages, links to Web pages, SMS messages, etc.

The wireless communications network I/O interface 20C may be adapted to communicate with a communication device, over the air via a communications network that may utilize any suitable technology including CDMA (Code Division Multiple Access), GSM (Global System for Mobiles), 4G LTE (Long Term Evolution), etc. The wireless communication network I/O interface 20C can allow the remote security server computer 20 to communication with the communication device 10 over a first communication channel 16 (see FIG. 1), which may include a cellular network in some embodiments.

Figure 3A:
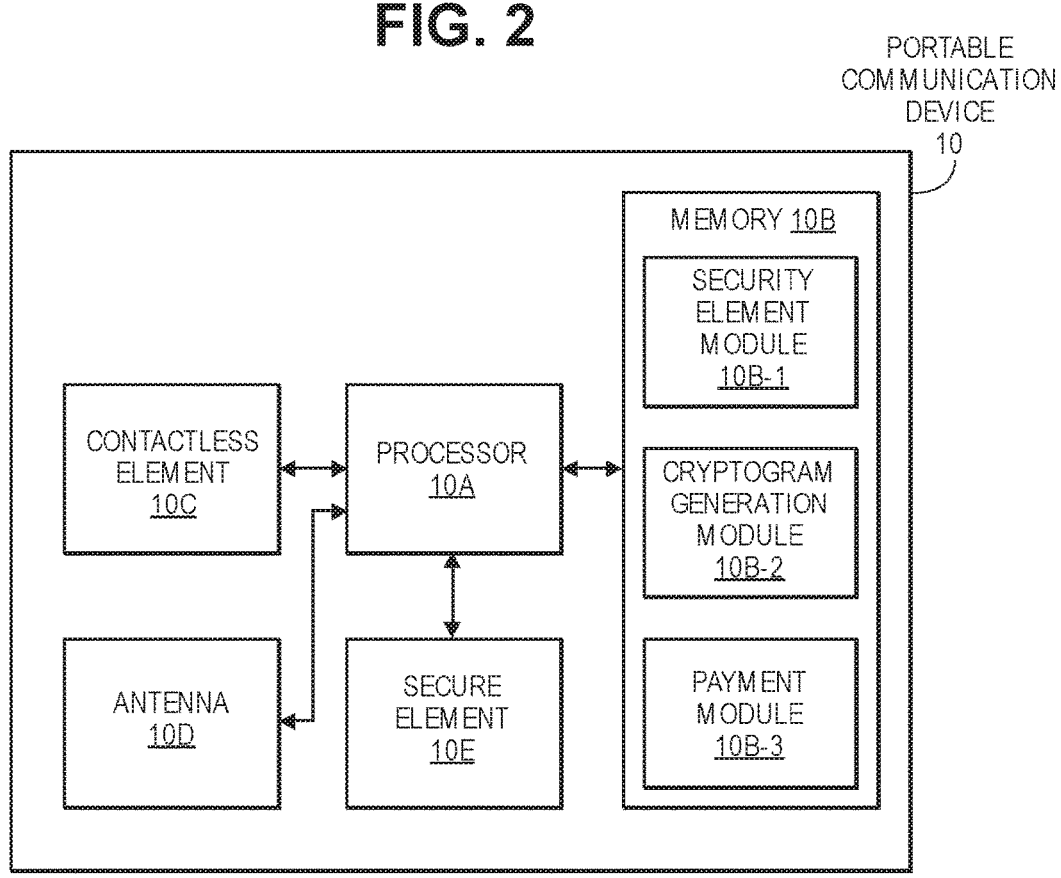
FIG. 3A shows a block diagram illustrating some components of a portable communication device according to an embodiment of the invention.

FIG. 3A shows a block diagram illustrating some components that may be present in the portable communication device 10. The components comprise a processor 10A, which may be coupled to a memory 10B, a contactless element 10C, an antenna 10D, and a secure element 10E. The memory 10B may comprise one or more security element modules 10B-1 (described further herein with respect to FIG. 3B), a cryptogram generation module 10B-2, and a payment module 10B-3. The processor 10A and the memory 10B may have the same or different characteristics as the processor 20A and the memory 20B described above in FIG. 1.

The contactless element 10C may be a device that allows the mobile phone 10 to communicate payment information to an access device (e.g., a POS terminal) at a merchant location. The contactless element 10C may operate using any suitable communication mode including RF, BLE (classic and low energy Bluetooth), NFC (near field communications), IR, etc. In some embodiments, the contactless element 10C may comprise an antenna (e.g., a short range antenna) and a memory device.

The antenna 10D may allow the mobile phone 10 to communicate through a long range communication channel and with a mobile network operator. Referring to FIG. 1, in some embodiments, the antenna 10D may allow the portable communication device 10 to communicate with the security server computer 20, while the contactless element 10C may allow the portable communication device 10 to communicate with the access device 30.

The secure element 10E may be a tamper-resistant platform (typically one with a chip secure microcontroller) capable of securely hosting applications and their confidential and cryptographic data (e.g., key management) in accordance with rules and security requirements of trusted authorities. It may include a trusted execution environment that is secure and may store account credentials (e.g., payment account numbers, payment tokens, verification values such as CVV, CVV2, dCVV and cryptogram (ARQC) values, etc.) or access credentials. Some embodiments of the invention may not include or use a secure element. Other embodiments of the invention may include an unsecure element or regular storage element having data protected by cryptography. Embodiments of the invention could be used with cloud based payments platforms including those described in U.S. patent application Ser. No. 14/577,837 entitled "Cloud-Based Transactions Methods and Systems," filed on Dec. 19, 2014, and assigned to the same assignee as the present application. This application is herein incorporated by reference in its entirety for all purposes.

The cryptogram generation module 10B-2 may include code, which when executed by the processor 10A, may generate a cryptogram. The cryptogram may include a variety of data, and may or may not be derived from security notification data generated using the security element modules 10B-1. In some embodiments, the security element modules may be referred to as "security guard modules."

The cryptogram generation module 10B-2 may also be used to store the key used to generate the cryptogram.

The payment module 10B-3 may include code, which when executed by the processor 10A, can obtain, format, and transmit payment data for a transaction. In some embodiments, the payment module 10B-3 may retrieve payment data such as account numbers or payment tokens, expiration dates, service codes and other data in stored in the portable communication device 10 or remotely from the portable communication device 10, and may format it such that it may be transmitted to and processed by an access device.

Figure 3B:
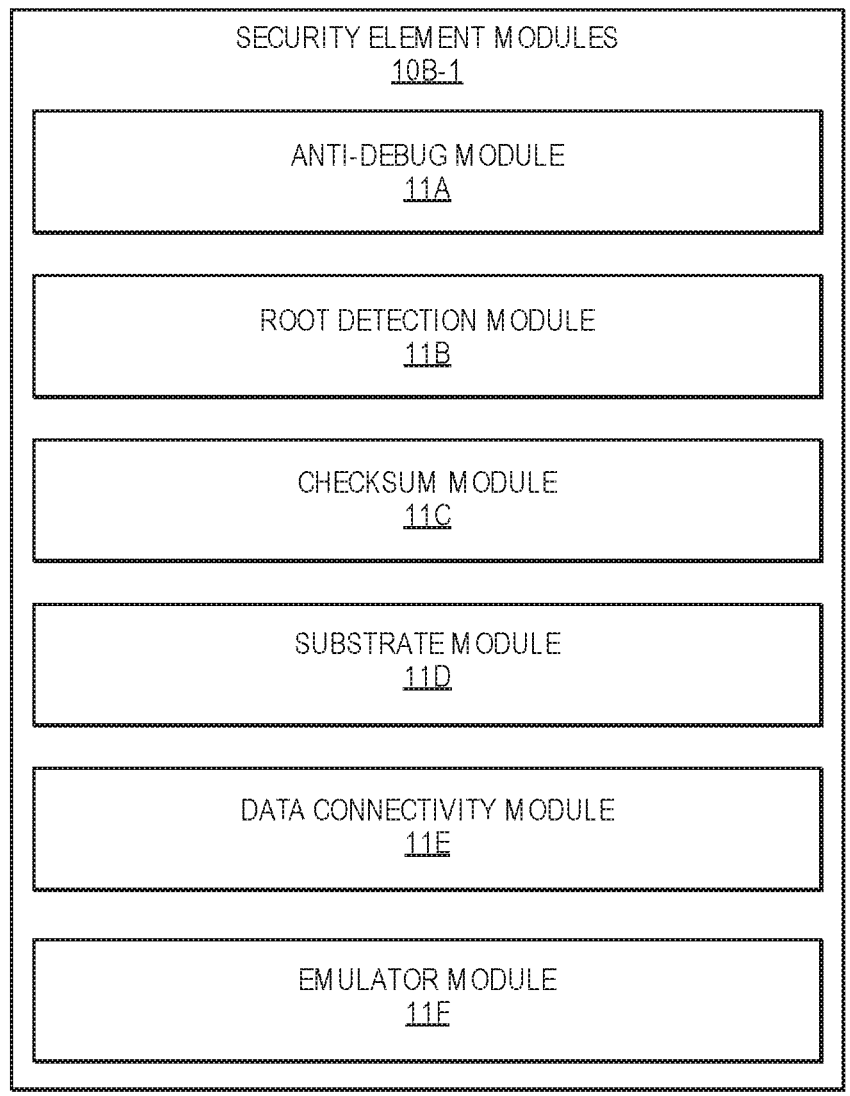
FIG. 3B shows a block diagram illustrating some components of security element modules according to an embodiment of the invention.

FIG. 3B shows a block diagram illustrating some components that may be present in the security element modules 10B-1 of the memory 10B of the portable communication device 10 to detect access by an unauthorized user. The components comprise an anti-debug module 11A, a root detection module 11B, a checksum module 11C, a substrate module 11D, a data connectivity module 11E, and a emulator module 11F. This is a non-limiting list of security element modules that may be used in embodiments of the invention, and it is understood that other security element modules may be alternatively or additionally implemented. It is understood that the implementation of these security element modules is just one method among any number of methods that may be used to detect security compromises of the portable communication device 10.

The anti-debug module 11A, in conjunction with the processor 10A, detects whether a debugger is attached while native software development kit (SDK) code is in use.

Root detection module 11B, in conjunction with the processor 10A, detects whether the a device is attempting to use the SDK after the device has been "rooted". In other words, root detection module 11B detects whether the portable communication device 10 on which an application is running has been modified to allow users or applications privileged access to the operating system.

Checksum module 11C, in conjunction with the processor 10A, detects whether an attacker has modified SDK code or added a breakpoint to the code by comparing a checksum of the protected range computed at protection time to a checksum of the range computed at runtime. If the two checksum values do not match, an unauthorized user has tampered with the code.

Substrate (hooking) module 11D, in conjunction with the processor 10A, detects whether an attacker has overridden a called function that resides in a system library or within the application.

Data connectivity module 11E, in conjunction with the processor 10A, detects whether a portable communication device has data connectivity, or whether data connectivity has been deliberately disabled (e.g., put into airplane mode).

Emulator module 11F, in conjunction with the processor 10A, detects whether a portable communication device is genuine or an emulator.

The security element modules 10B-1 can be implemented in such a way that they are subtle and hidden from the common user, and do not have to be explicitly activated or invoked by a user. Further, the security element modules 10B-1 can be configured as described herein so as not to rely on "call home" requests (i.e., security notification messages sent to and from the backend over an internet connection), as an attacker can stop "call home" requests, spoof responses, derive meaning from "call home" requests, or turn off internet access.

The binary protection provided by the security element modules 10B-1 can be available for a variety of devices, including, but not limited to, ARM, Intel, and MIPs-based Android devices. In one embodiment, the binary protection can apply to the native payment processing network SDK code, as opposed to the Java SDK code, so that issuers can debug their own applications, but cannot debug the native payment processing network SDK code.

Other modules implementing security measures to protect or prevent the portable communication device 10 from compromise by an unauthorized user may be used in addition to security element modules 10B-1. For example, an obfuscation module, in conjunction with the processor 10A, may convert the SDK native code (e.g., C or C++) into low level virtual machine (LLVM) bitcode instructions. This ensures that the code is difficult to understand. Despite obfuscation, the bitcode maintains the same functionality as the original SDK source code.

As another example, a repair/damage module, in conjunction with the processor 10A, may damage and/or repair code within the SDK at runtime. For example, the repair/damage module may repair a piece of damaged code to its original form to allow it to execute when appropriate, then damage it again. In another example, the repair/damage module may detect that an unauthorized user has damaged or tampered with a piece of code, and can overwrite it with a clean copy of the code stored elsewhere. This prevents an attacker from modifying the underlying SDK code, and is used to hide sensitive keys. In addition, a string literals module, in conjunction with the processor 10A, may encrypt and decrpyt SDK string literals at runtime.

Figure 4:
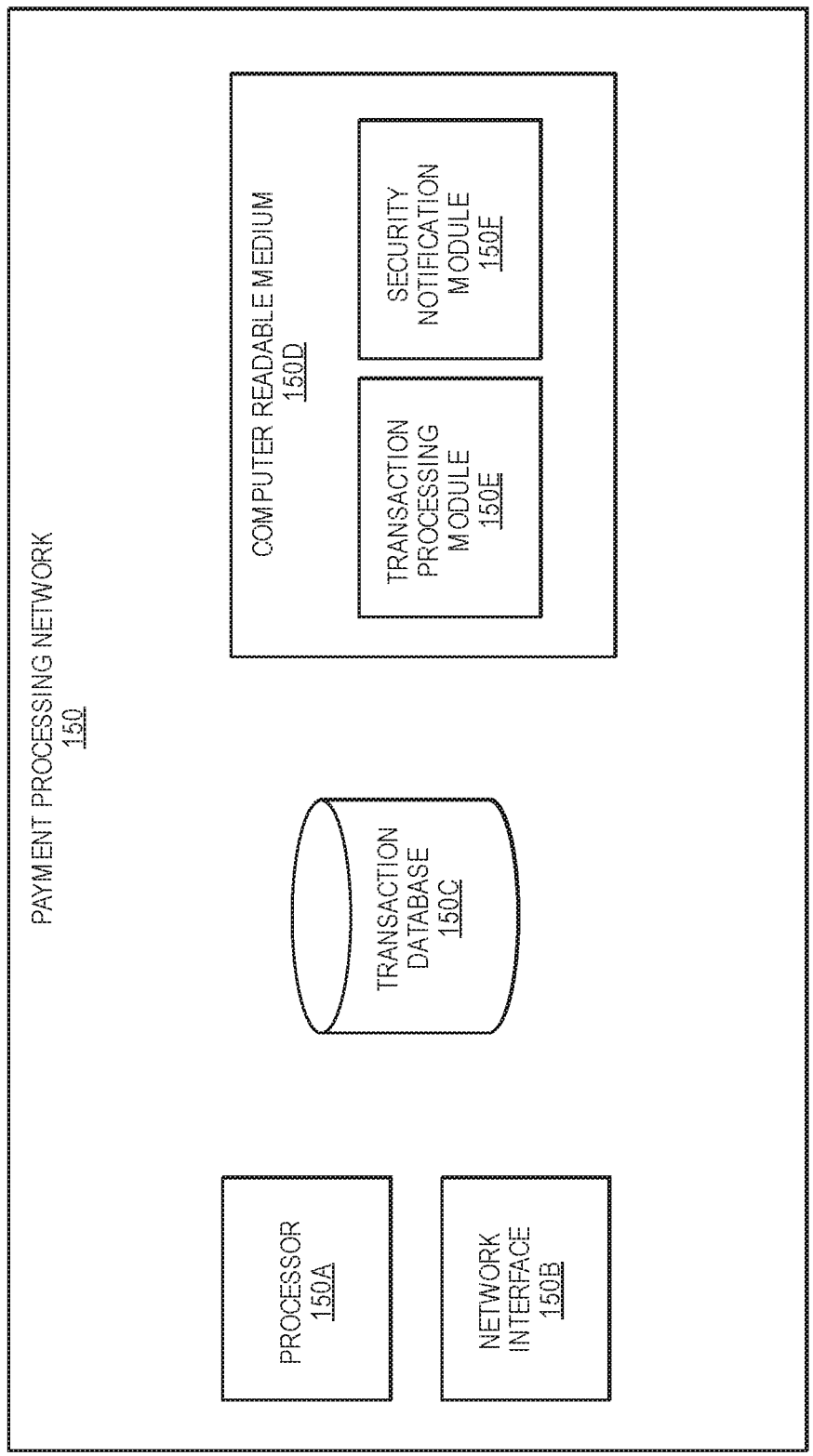
FIG. 4 is a block diagram illustrating some components of a payment processing network according to an embodiment of the invention.

FIG. 4 shows a block diagram illustrating some components of a payment processing network 150 according to an embodiment of the invention. The payment processing network 150 may be embodied by one or more computer computers, each of which may comprise a processor 150A, a network interface 150B, a transaction database 150C, and a computer readable medium 150D. The processor 150A and the computer readable medium 150D may have the same or different characteristics as the processor 20A and the memory 20B, respectively, described above in FIG. 1.

The computer readable medium 150D may store a transaction processing module 150E, a security notification module 150F, and any other suitable software module. The computer readable medium 150D may also comprise code, executable by the processor 150A, for implementing the functions of the payment processing network described herein with respect to FIGS. 5A and 5B.

The transaction processing module 150E may comprise code that causes the processor 150A to process transactions. For example, the transaction processing module 150E may contain logic that causes the processor 150A to analyze transaction risk; to forward, authorize, or reject authorization request messages for payment transactions; and to make recommendations regarding authorize/decline decisions. It may also contain logic that cause the processor 150A to forward authorization request messages to issuers, receive authorization response messages from issuers, and forward authorization response messages to resource providers such as merchants. The transaction processing module 150E may further comprise code that causes the processor 150A to generate expected authorization data (e.g., a cryptogram) to compare to received authorization data to determine whether the received authorization data is correct.

The transaction processing module 150E, in conjunction with the processor 150A, may also be able to store transaction records in the transaction database 150C. For example, the transaction database 150C may include a record of each completed transaction that includes transaction details (e.g., items purchased, amount, timestamp), resource provider information, user information (e.g., a name, a phone number and/or other contact information, a primary account number, a payment token corresponding to a primary account number, an expiration date, etc.), and/or any other suitable information.

Although FIG. 1 shows the payment processing network 50 being separate from and in communication with the security server computer 20, in other embodiments, the security server computer 20 may be incorporated into and may be part of the payment processing network 50.

Figure 5A:
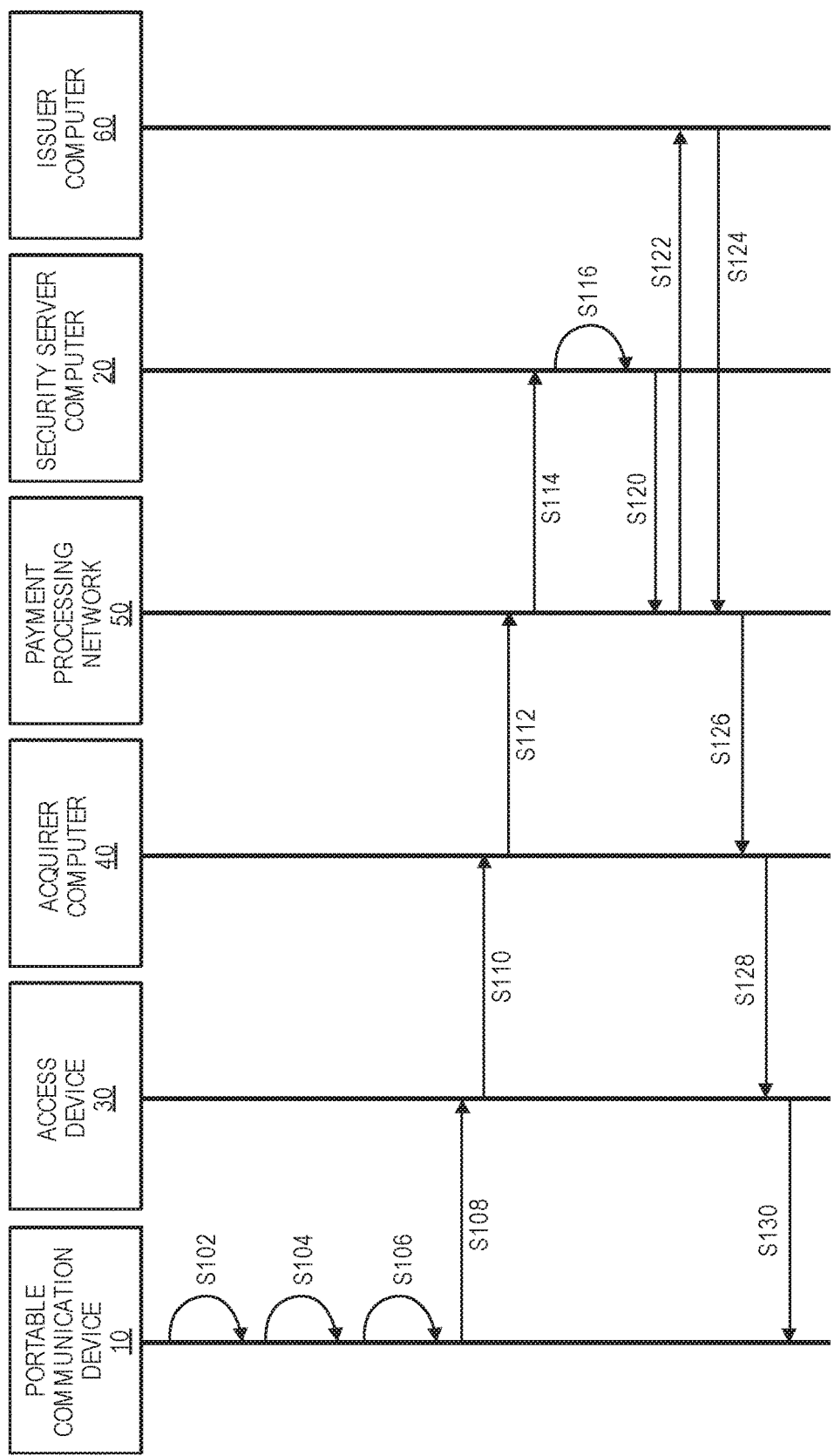
FIG. 5A is a flowchart illustrating a method according to an embodiment of the invention.

FIG. 5A shows a flowchart illustrating a method according to an embodiment of the invention. The method utilizes a payment processing network 50 that communicates with the security server computer 20. The flowchart in FIG. 5A can be described with reference to FIG. 1.

In step S102, a security element module 10B-1 associated with a security software application, working in conjunction with the processor 10A, can determine that the portable communication device 10 has been accessed by an unauthorized user. For example, software on the portable communication device 10 may have been altered in an abnormal way, or portable communication device 10 may have been previously hacked. In one embodiment, the security element module 10B-1 can then move the attacker into a dummy code branch that prevents further information within the secure storage area from being divulged. For example, the security element module 10B-1 can move an attacker into a different, non-secure code branch that executes random routines and long loops that do not lead anywhere useful. The security element module may not report a specific error code or error message to the software provider of the hacked software, as the attacker may be reading any message.

In step S104, after the processor 10A determines that the software on the portable communication device has been altered, one or more security software applications, working in conjunction with the processor 10A, may then generate security notification data. The security notification data may include an indication of the type of security software applications or security element modules that determined the abnormal alteration. The security software applications may be in the form of security element modules which can provide binary protection. In one embodiment, a plurality of security element modules may be provided and executed. This ensures that an attacker has to break multiple security element modules before any information can be accessed.

Security notification data may take different forms. In some embodiments, the security notification data may simply be in the form of a security notification data flag that indicates that the security of the mobile device has been compromised. In other embodiments, the security notification data may be incorporated as part of authentication data in a transaction. The authentication data may ordinarily be used to authenticate any suitable component of a transaction including the consumer, the device (e.g., account, card, phone, etc.) being used to conduct the transaction, or the transaction itself (e.g., a cryptogram that indicates that a party such as an issuer has already authenticated the consumer). Thus, such authentication data may be derived from the security notification data.

In some embodiments, the authentication data may be in form of an application cryptogram, or authentication cryptogram such as a CVV (card verification value), CVV2, dCVV (dynamic card verification value), or dCVV2 that may be used to authenticate the portable communication device 10 (or alternate payment device) value. In yet other embodiments, the authentication cryptogram may be an ARQC cryptogram or an authorization request cryptogram. The ARQC cryptogram is normally used for transactions requiring online authorization. It is the result of a card, terminal and transaction data encrypted with a DES key. The issuer typically validates the ARQC to ensure that a card or other payment device is authentic.

As an illustration, the dCVV value associated with a payment card at a particular point in time may be 889 and this dCVV value may be stored on a portable communication device such as a mobile phone along with an account number, expiration date, and other data associated with an underlying account. The dCVV value is a dynamic value that can be used to relay security notification data, as described further herein. Under normal circumstances in a typical payment transaction where no tampering of the portable communication device occurs, the dCVV value of the payment card would be transferred from the portable communication device to the access device (e.g., a POS or point of service terminal), which will then generate an authorization request message that is sent to an issuer (or other party such a payment processing network) for approval. The issuer or the payment processing network can then verify that the received dCVV value is the expected dCVV value and can use this to confirm that the portable communication device that was used to conduct the transaction is in fact the authentic device. Specifically, the issuer or the payment processing network may independently generate the dCVV value using the payment account number, the expiration date, a 3-digit service code, and a pair of DES encryption keys, and may determine if this calculated number matches the dCVV value received in the authorization request message. Methods for generating dynamic values can be found in U.S. Pat. No. 7,761,374, which is herein incorporated by reference in its entirety.

As noted above, the security notification data may be used as an input to create the cryptogram, and as a result, the created cryptogram will not be the cryptogram that would otherwise be expected by a remote computer verifying the cryptogram. For example, as explained in the above-noted U.S. Patent, the input to the cryptogram might be a primary account number, expiration date, service code, or padding that is altered using the security notification data. For example, when generating a cryptogram, values such as the primary account number, the expiration date, and service code may be concatenated, encrypted, and otherwise processed to create a cryptogram. Padding (e.g., a string of zeros) can sometimes be added to strings of data during the encryption process. In embodiments of the invention, the security notification data could be used to change the padding values to change the cryptogram to a value that is different than its expected value so that a remote server computer may be notified that a security breach has occurred on the mobile device. In other embodiments, values such as the PAN, expiration date, and service code could also or alternatively be altered by the security notification data. In this situation, the PAN expiration date, and/or the service code would be altered only for the purposes of the generation of the cryptogram, and would not be altered when this information is transmitted in the clear (or channel encrypted) in any authorization request message that is sent to a payment processor or to an issuer.

In an example of embodiments of the invention, when one or more security element modules have determined that an unauthorized person has tampered with the portable communication device or the software on it, the one or more security element modules may generate a new dCVV that will be created using security notification data. Because this new dCVV will not be the value that will be expected by the issuer, the transaction will be declined. As an illustration, instead of generating a normal dCVV cryptogram, after receiving an indication from the security elements modules 10B-1 that the portable communication device has been tampered with, the cryptogram generation module 10B-2 on the portable communication device 10 may utilize a number that is different than the normal expiration date, the normal primary account number, the normal service code, or the normal padding character to generate the dCVV. For example, if the normal expiration date is 08/2018, then the expiration date may be changed to 08/0118 and a dCVV may be calculated from that value. Thus, if the normal dCVV was 898 and the altered dCVV is 125, then the payment processing network or the issuer receives the altered dCVV 125. The issuer or the payment processing network then tries to calculate the altered dCVV and it will independently calculate the normal dCVV 898, and can deny the transaction because the altered dCVV does not match the calculated normal dCVV. In other embodiments, the altered dCVV may indicate what type of compromise occurred. For example, the security element modules 10B-1 may inform the cryptogram generation module 10B-2 that the expiration date should be 08/0118 if malicious code has been incorporated into the communication device 10, should be 08/0218 if an application on the mobile device has been altered, and should be 08/0318 if both an application on the mobile device has been altered and malicious code has been inserted into the portable communication device 10. This altered expiration date can be used to generate the dCVV; however, the correct expiration date can be sent to the issuer, for example, along with the altered dCVV, such that the transaction declines due to the security notification contained in the altered dCVV, and not due to the incorrect expiration date.

In embodiments of the invention, security element module(s) may build a bitmap in Issuer Application Data (tag 9F10), which for each security element module that is deemed important to report, raises a corresponding bit signaling that a specific element module was activated. Issuer Application Data (tag 9F10) is transaction data formatted to be transported from a payment device to an issuer, and can be transported in a contact or a contactless transaction between the communication device 10 and the access device 30. Issuer Application Data (tag 9F10) may include security notification data, such as a corresponding bit for each security element module 10B-1.

In one example, security element module(s) may set an unused byte in the Card Verification Results (CVR) of the Issuer Application Data, which is generally set for each transaction. Any subsequent transaction with the same short-lived payment data will retain the CVR indicator. A customer or attacker will then have to successfully pass issuer authentication and replenish payment credentials to remove the marker against payment credentials held within secure storage.

The Issuer Application Data is a component in creating an Online Authorization request (ARQC) cryptogram. As such, if an attacker detects that the payment processing network is setting an indicator in the CVR and attempts to remove the indicator, any transaction will decline at the payment processing network. This occurs because the device-generated ARQC (without the indicator) will not match the payment processing network-generated ARQC (with the indicator). The payment processing network can now additionally put the account on a hot-list and/or can report the situation to the issuer.

In still another example, security element module(s) may define separate "hidden" values that are included in the cryptogram generation on phone/cryptogram validation in the payment processing network. If the cryptogram validation fails, the payment processing network can try the different values and for the combination where the cryptogram verifies correctly, the payment processing network can now infer which of the element modules was activated. The transaction would be declined (due to cryptogram failure), and the payment processing network can now additionally put the account on a hot-list and/or can report the situation to the issuer. This way, specific data elements do not need to be carried in the payment transaction. This method can be used for magnetic stripe transactions that use magnetic stripe data as well as contactless transactions.

In one embodiment, the security notification data, or any derivative thereof (e.g., a dCVV value), may be sent to a remote security server computer in its raw or obfuscated (e.g., encrypted form). In some embodiments, the security notification data may be sent to the security server computer at least through the second communication channel 18, but it may also be sent through the first communication channel 16 in FIG. 1.

In other embodiments, as illustrated in step S106, after the security notification data is formed, the payment module 10B-3 may generate a transaction data packet that will be passed to the access device 30. In some embodiments, the transaction data packet may be a payment data packet. The payment data packet may include a cryptogram that verifies the authenticity of the portable communication device or the software that resides on it, account credentials (e.g., a PAN or payment token, and account expiration date, or any other suitable data). As explained above, security notification data may be generated by the portable communication device if it has been tampered with, and included in the transaction data packet.

In step S108, the payment data packet is transferred from the portable communication device 10 to the access device 30. This may be done using any suitable contact or contactless mode of communication.

In step S110, the access device 30 may receive the transaction data packet, generate an authorization request message, and transmit it to an acquirer computer 40. The authorization request message may have the characteristics described above, and may also include the security notification data or derivative thereof.

In step S112, the acquirer computer 40 may transmit the authorization request message to a payment processing network 50.

In step S114, the payment processing network 50 may receive the authorization request message and may parse it (e.g., extract the security notification data or derivative thereof from it). Payment processing network 50 may then send the security notification data or derivative thereof to the security server computer 20. For example, the payment processing network 50 may send a received cryptogram or the raw security notification data to the security server computer 20.

In step S116, the security server computer 20 may then receive this information and may analyze it to determine whether or not the portable communication device 10 has been accessed by an unauthorized user or compromised. In some embodiments, the security server computer 20 may compare the cryptogram that was received in the authorization request message to an expected cryptogram that it independently generated to determine whether or not they match. If they do not match, the portable communication device 10 has likely been accessed by an unauthorized user or compromised. The security server computer may also analyze the security notification data or the derivative of the security notification data to determine a type of access by the unauthorized user, such as a type of security element module that detected the unauthorized access. The security server computer may know ahead of time what cryptogram would be generated if certain types of data compromises occurred.

In step S120, the security server computer 20 may provide an indication to the payment processing network 50 as to whether or not the portable communication device 10 has been compromised. In one embodiment, the payment processing network 50 may report that the portable communication device 10 has been accessed by an unauthorized user and that a payment transaction has been attempted, for example, to a known authorized user of the portable communication device 10, to a cloud-based payments platform, or to any other party such as the issuer 60. In yet other embodiments, the payment processing network 50 may simply generate an authorization response message declining the transaction on behalf of the issuer and may transmit an authorization response message back to the access device 30 via the acquirer computer and the payment processing network 50. In still other embodiments, the payment processing network 50 may use the indication of compromise as an input to a fraud score, and this fraud score may be transmitted to the issuer computer 50 in a modified authorization request message. The payment processing network 50 may also take additional measures, such as automatically declining any subsequent transactions from the same portable communication device 10.

In step S122, the payment processing network 50 may then transmit the authorization request message to the issuer 60 for approval. In some embodiments, if the portable communication device 10 has been compromised, the indication of compromise or the security notification data or derivative thereof may be included in the authorization request message.

In step S124, after receiving the authorization request message, the issuer computer may analyze the authorization request message and may determine whether or not to authorization the transaction, and may then send an authorization response message back to the payment processing network. If the issuer computer 60 determines that the portable communication device 10 has been compromised, it may elect to decline the transaction or it may alternatively or additionally notify the consumer operating the portable communication device 10 that it has been compromised.

In step S126, the payment processing network may send the authorization response message to the acquirer computer 40.

In step S128, the acquirer computer 40 sends the authorization response message to the access device 128.

In step S130, in some cases, the access device 128 may send some other message (e.g., a receipt) indicating completion of the transaction to the portable communication device 10.

At the end of the day or at some other time, if the payment transaction had actually been valid, then a clearing and settlement process can occur between the acquirer computer 40, the payment processing network 50, and the issuer computer 60. No clearing and settlement will take place if the transaction is declined.

Figure 5B:
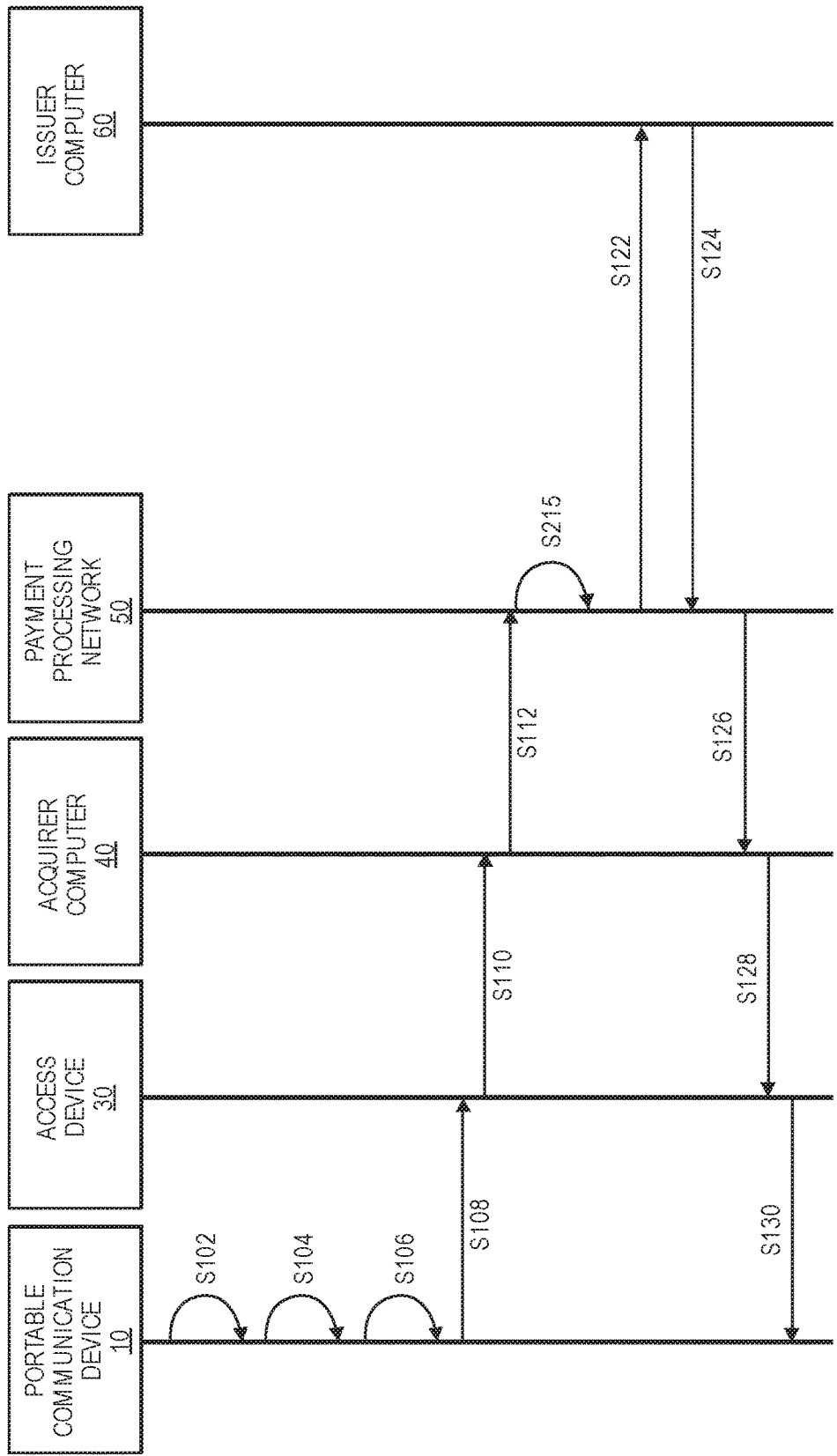
FIG. 5B is a flowchart illustrating a method according to another embodiment of the invention.

FIG. 5B shows a flowchart illustrating a method according to an embodiment of the invention in which the functions of the security server computer are integrated into the payment processing network, but is otherwise similar to the method described above with respect to FIG. 5A.

With reference to FIG. 5B, after the acquirer computer 40 transmits the authorization request message to a payment processing network 50 at step S112, the payment processing network 50 performs a variety of functions at step S215. Specifically, at step S215, the payment processing network 50 may extract security notification data from payment packet data included in the authorization request message and determine whether the portable communication device 10 has been compromised. It may perform the functions described above in step S116 in FIG. 5A. In step S122, the payment processing network 50 may then transmit the authorization request message to the issuer 60 for approval. If the portable communication device 10 has been compromised, the indication of compromise or the security notification data or a derivative thereof may be included in the authorization message. The method may then continue as described with respect to FIG. 5A.

Embodiments of the invention have a number of advantages. For example, because embodiments of the invention can transmit security notification data to a security server or a payment processing network through a data channel that is different than a normal cellular communication channel, fraudsters and hackers cannot prevent notification of device compromise by turning off the electronics associated with transmitting such data through the cellular network. In addition, because the security notification data can be modified into a derivative such as a cryptogram, no infrastructure changes are required to pass the indication of compromise to the remove security server through the second communication channel.

Figure 6:
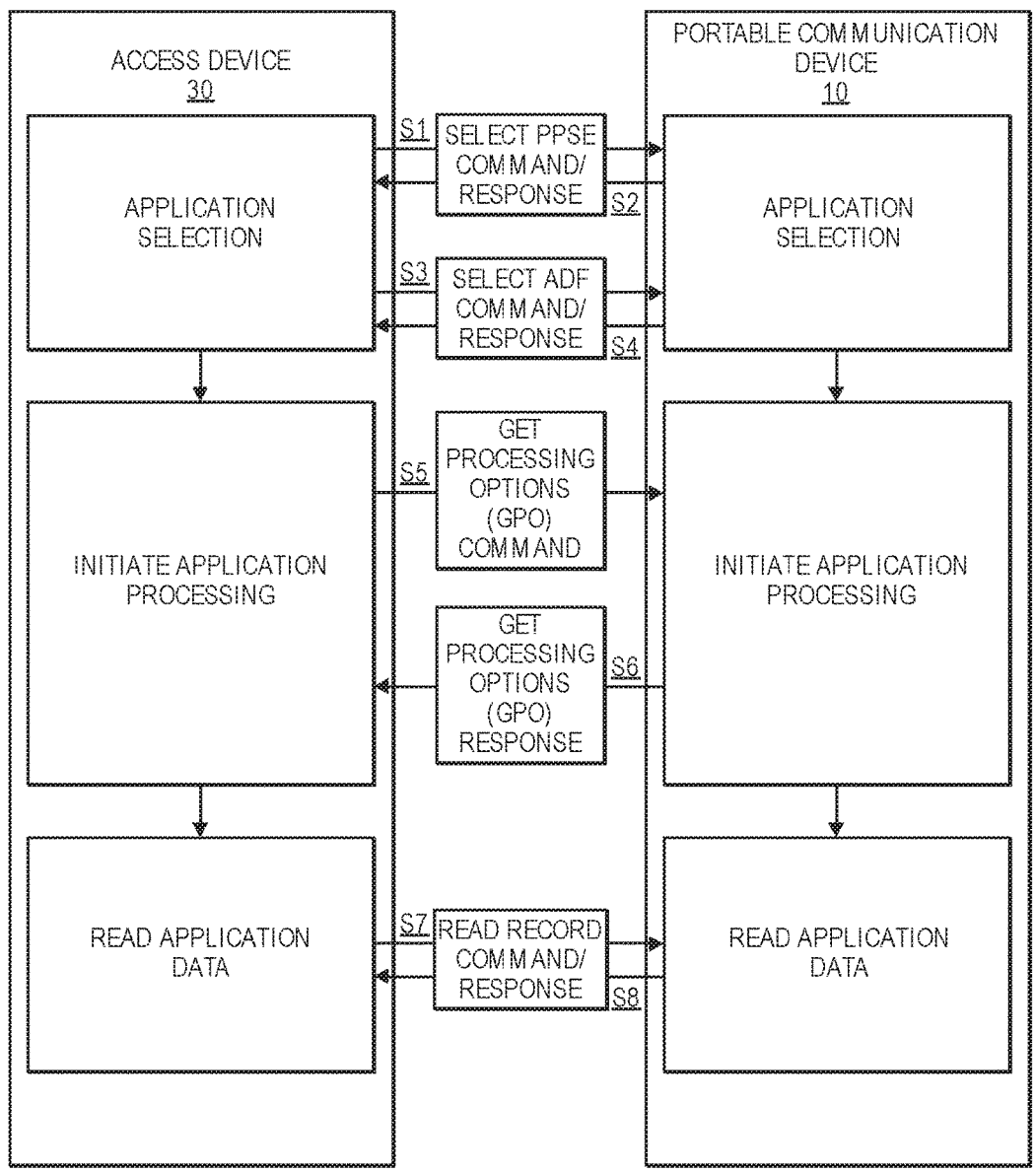
FIG. 6 shows a block diagram illustrating a system and method for communication between a portable communication device and an access device according to an embodiment of the invention.

FIG. 6 shows a block diagram illustrating a system and method for communication between a portable communication device 10 and an access device 30 according to an embodiment of the invention. Portable communication device 10 and access device 30 may be as described with respect to FIG. 1.

In order to initiate the method, the user may select one or more goods and/or services for purchase at a merchant, and then initiate a payment transaction. The user may choose to pay via portable communication device 10. In some embodiments, the user may activate a digital wallet application, select a payment account, and initiate a payment functionality. In other embodiments, the payment functionality may be automatic. In either case, the user may hold the portable communication device 10 near to (e.g., within communication proximity of) the access device 30.

In some embodiments, a contactless transaction can then be carried out by exchanging messages (e.g., Application Protocol Data Unit (APDU) messages) between the portable communication device 10 and the access device 30. The messages can be in the form of APDU commands sent from the access device 30 to the portable communication device 10, and APDU responses sent from the portable communication device 10 to the access device 30. As described in this method, NFC will be used for the communications. However, embodiments allow other communication means (e.g., BLE, RFID) to be used as well.

At step S1, when access device 30 detects the presence of the portable communication device 10, the access device 30 may initiate a transaction by sending an available applications request to the portable communication device 10 to request information on which payment applications (e.g., a list of Application Identifiers or "AIDs") may be available on the digital wallet application of portable communication device 10. In some embodiments, the available applications request may be in the form of a select PPSE (proximity payment system environment) command. The available applications request may include a payment environment identifier (e.g., a PPSE name such as "2PAY.SYS.DDF01") to identify the payment environment supported by access device 30 and the mobile application.

At step S2, the portable communication device 10 may respond by sending an available applications response back to access device 30. The available applications response may include a list of available AIDs, and may include the payment environment identifier (e.g., PPSE name). In some embodiments, the available applications response may be in the form of a select PPSE response.

At step S3, the access device 30 may select a suitable application from the list of applications received in the available applications response (e.g., by selecting an AID from the available AIDs). For example, the access device 30 may select a proximity payment application that is supported by both the access device 30 and the portable communication device 10. The access device 30 may also send an application selection message with the selected AID to the portable communication device 10. In some embodiments, the application selection can be in the form of a select AID (or ADF) command.

At step S4, the portable communication device 10 may send a request for transaction data to the access device 30 which may be needed to execute the transaction using the selected application/AID. In some embodiments, the request may be in the form of a select AID (or ADF) response. The request may include a list of transaction data identifiers, and the list can be in the form of a processing options data object list (PDOL). The transaction data requested may include terminal transaction qualifiers (TTQ), authorized amount, other amount, terminal country code, terminal verification results, transaction currency code, transaction data, transaction type, and/or an unpredictable number.

At step S5, the access device 30 may send the requested terminal transaction data. In some embodiments, the terminal transaction data may be sent in the form of a get processing options (GPO) command, and may include the requested terminal transaction data in a processing options data object list (PDOL).

At step S6, the portable communication device 10 may generate dynamic transaction processing information using at least some of the received terminal transaction data, and send a set of transaction processing information to the access device 30. In some embodiments, the transaction processing information can be sent in the form of a GPO response. In some embodiments, the transaction processing information may include one or more application file locators (AFLs) that can be used as file addresses by access device 30 to read account data stored on portable communication device 10.

Additionally, the portable communication device 10 may identify security notification data as discussed herein. Portable communication device 10 may then add the security notification data or a derivative of the security notification data to the access device 30, such that the access device 30 can retrieve the security notification data or the derivative of the security notification data along with the transaction processing information. Although the passage of security notification data or a derivative thereof is passed in step S6 in this example, it can be passed in any other suitable message from the portable communication device 10 to the access device 30.

At step S7, the access device 30 may send an account data request to the portable communication device 10 to read account data stored at the portable communication device 10. In some embodiments, the account data request may be in the form of a read record command, and may include an application file locator (AFL) indicating the location of the account data.

At step S8, the portable communication device 10 may send the account data to the access device 30. In some embodiments, the account data may be sent in the form of a read record response. The account data may include, for example, track-2 equivalent data and the cardholder name, and/or other account related data that is accessible at the AFL location.

Having obtained the requisite data, the access device 30 may then utilize some or all of the obtained data elements (e.g., from the transaction processing information, the security notification data or derivative of the security notification data, and the account data) to generate a transaction authorization request message, as described further herein.

It is noted that although the above-described embodiments relate specifically to payments, embodiments of the invention can also be applied to other areas. For example, portable communication devices can be used to access building, venues or specific locations. Evidence of device tampering may also be passed in a cryptogram that is passed from the communication device to an access device to gain access to a particular location. In a similar manner, a computer associated with the venue or location may determine whether or not the communication device has been compromised.

Figure 7:
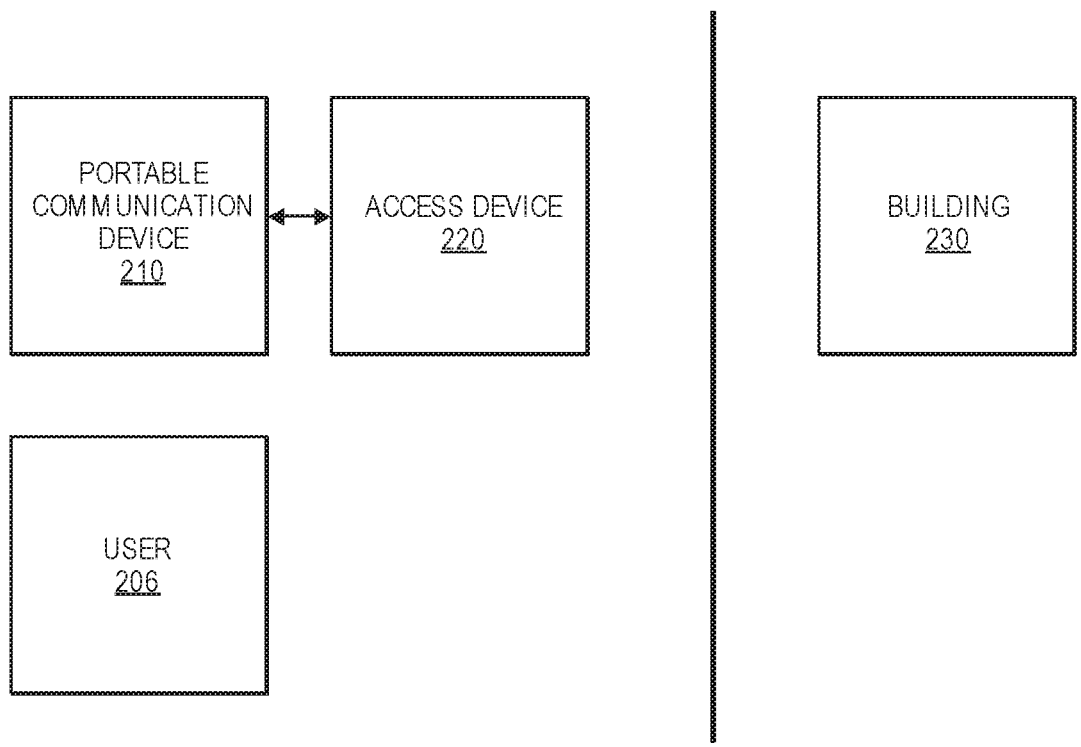
FIG. 7 shows a block diagram of a building access system according to an embodiments of the invention.

For example, FIG. 7 shows a block diagram of a building access system in accordance with an embodiment of the invention. FIG. 7 shows a portable communication device 210 operated by a user 206. It has been determined that software on the portable communication device 210 has been altered in an abnormal way as described above, and security notification data has been generated as described above. The portable communication device 210 can interact with the access device 220 and pass the security notification data along with access data to the access device 220. The access device 220 may locally analyze the security notification data and access data to determine whether access should be granted to building 230, or it may communicate with a remotely located server computer (not shown). The remotely located server computer may analyze the security notification data to determine whether access should be granted to building 230, and may transmit a signal indicating this back to the access device 220. The access device 220 may then proceed to allow or deny access by the user 206 to the building 230.

The various participants and elements described herein with reference to FIG. 1 may operate one or more computer apparatuses to facilitate the functions described herein. Any of the elements in FIG. 1, including any servers or databases, may use any suitable number of subsystems to facilitate the functions described herein.

Figure 8:
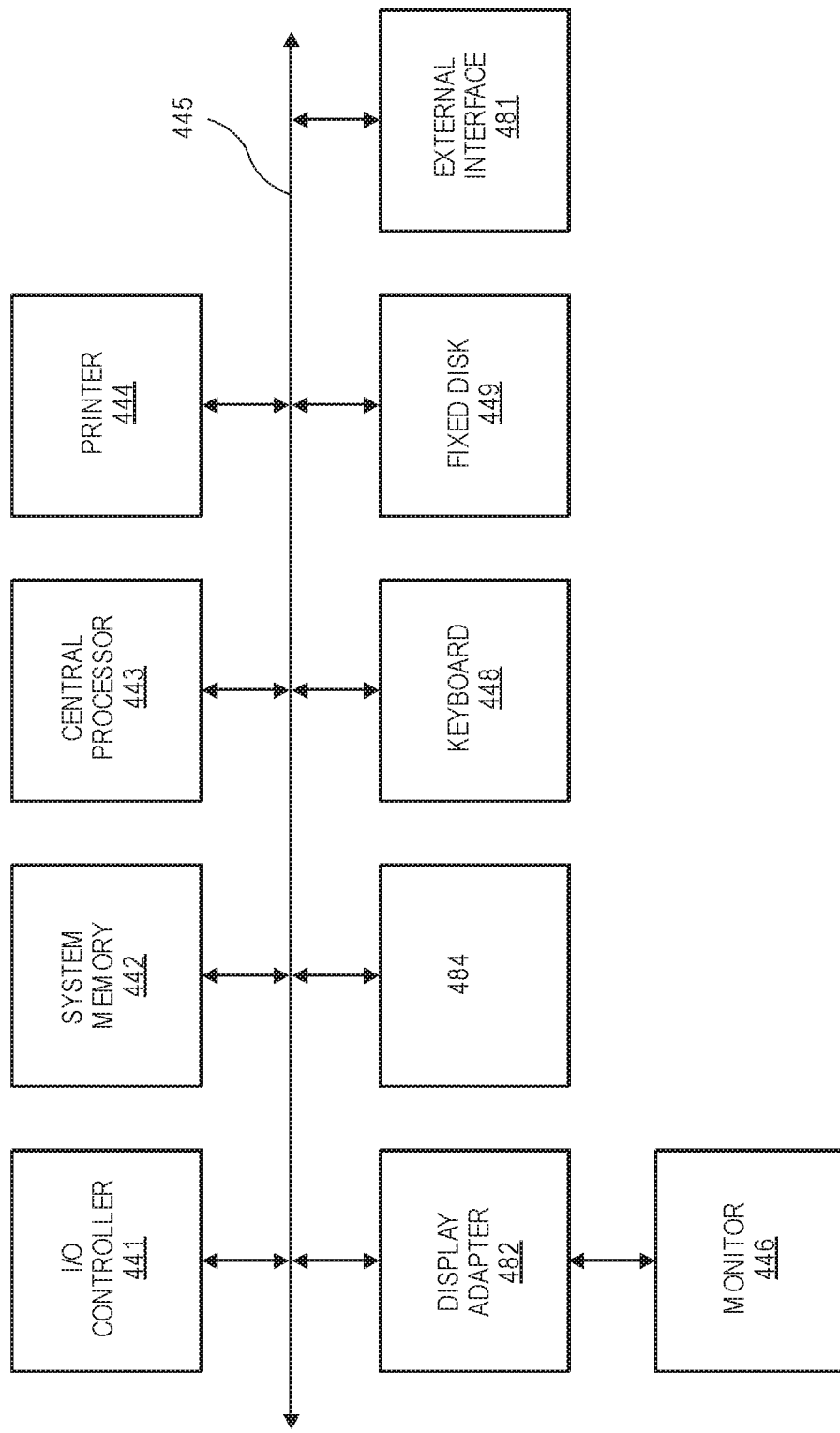
FIG. 8 shows a block diagram of a computer apparatus according to an embodiment of the invention.

Examples of such subsystems or components are shown in FIG. 8. The subsystems shown in FIG. 8 are interconnected via a system bus 445. Additional subsystems such as a printer 444, keyboard 448, fixed disk 449 (or other memory comprising computer readable media), monitor 446, which is coupled to display adapter 482, and others are shown. Peripherals and input/output (I/O) devices, which couple to I/O controller 441 (which can be a processor or other suitable controller), can be connected to the computer system by any number of means known in the art, such as serial port 484. For example, serial port 484 or external interface 481 can be used to connect the computer apparatus to a wide area network such as the Internet, a mouse input device, or a scanner. The interconnection via system bus allows the central processor 443 to communicate with each subsystem and to control the execution of instructions from system memory 442 or the fixed disk 449, as well as the exchange of information between subsystems. The system memory 442 and/or the fixed disk 449 may embody a computer readable medium.

Embodiments of the present invention may be implemented in conjunction with a cloud-based payments platform that tracks power-users by value of spending and volume of transactions, so that any potential higher risk communication devices are known. This information may be made available to software providers, such as mobile application providers, to make payment risk management decisions.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for preventing unauthorized access of data on a mobile device on a cellular phone network, the method comprising:
    determining, by a security software application using a hardware processor on the mobile device, that the mobile device has been accessed by an unauthorized user;
    determining a type of the security software application on the mobile device that has been accessed;
    sending, by the mobile device configured to communicate with a telecommunications network, a communication, wherein the communication is sent over the air through a first communication channel including a long range communication channel, wherein the first communication channel is the cellular phone network;
    generating, by the hardware processor on the mobile device, security notification data in response to the determining that the mobile device has been accessed by the unauthorized user, wherein the security notification data comprises the type of the security software application that determined an unauthorized access; and
    providing, by the mobile device, the security notification data or a derivative of the security notification data, in a form of a cryptogram to an access device by a short range antenna in the mobile device via a second communication channel, the access device forwarding the cryptogram to a remote server computer, where the remote server computer determines that the unauthorized user has accessed the mobile device by determining that the forwarded cryptogram does not match an expected cryptogram in order to prevent unauthorized access of data on the mobile device on the cellular phone network.

2. The method of claim 1, wherein the mobile device comprises access credentials.

3. The method of claim 1, wherein the security software application comprises a security element module.

4. The method of claim 3, wherein the security element module comprises at least one of an anti-debug module, a root detection module, a checksum module, and a substrate module.

5. The method of claim 1, wherein the mobile device is a mobile phone comprising a memory comprising a security element module, a cryptogram generation module and a payment module.

6. The method of claim 1, wherein the access device receives the cryptogram and transmits the cryptogram in an authorization request message comprising a transaction amount to a payment processing network via an acquirer computer.

7. The method of claim 6, wherein the payment processing network extracts the cryptogram from the authorization request message and provides the cryptogram to a security server computer, which determines if the mobile device has been compromised using the cryptogram.

8. A mobile device comprising:
    a hardware processor; and
    a non-transitory computer readable medium coupled to the hardware processor, the computer readable medium comprising code, executable by the processor to implement a method for preventing unauthorized access of data on the mobile device on a cellular phone network comprising:
        determining that the mobile device has been accessed by an unauthorized user;
        determining a type of a security software application on the mobile device that has been accessed;
        sending a communication to a telecommunications network, wherein the communication is sent over the air through a first communication channel including a long range communication channel, wherein the first communication channel is the cellular phone network;
        generating security notification data in response to the determining that the mobile device has been accessed by the unauthorized user, wherein the security notification data comprises the type of the security software application that determined an unauthorized access; and
        providing the security notification data or a derivative of the security notification data, in a form of a cryptogram to an access device by a short range antenna in the mobile device via a second communication channel, the access device forwarding the cryptogram to a remote server computer, where the remote server computer determines that the unauthorized user has accessed the mobile device by determining that the forwarded cryptogram does not match an expected cryptogram in order to prevent unauthorized access of data on the mobile device on the cellular phone network.

9. The mobile device of claim 8, wherein the computer readable medium further comprises:
a cryptogram generation module configured to create the cryptogram using the security notification data.

10. The mobile device of claim 8, further comprising:
an antenna coupled to the processor and configured to communicate via the first communication channel.

11. The mobile device of claim 8, further comprising:
a contactless element coupled to the processor and configured to communicate via the second communication channel.

12. The mobile device of claim 8, wherein the computer readable medium comprises a security element module.

13. The mobile device of claim 12, wherein the security element module comprises at least one of an anti-debug module, a root detection module, a checksum module, and a substrate module.

14. A server located remotely from a mobile device running a security software application, the server comprising:
a processor; and
a memory coupled to the processor, the memory storing instructions, which when executed by the processor, cause the server to perform operations including:
receiving, from an access device, an authorization request message including data for a transaction and security notification data or a derivative of security notification data, in a form of a cryptogram, where the access device receives the cryptogram from the mobile device by a short range antenna,
extracting the security notification data or the derivative of the security notification data from the authorization request message,
analyzing the security notification data or the derivative of the security notification data to determine that an unauthorized user has accessed the mobile device, and
generating an authorization response message declining the transaction in order to prevent unauthorized access of data on the mobile device on a cellular phone network.

15. The server of claim 14, wherein the operations further include:
reporting that the unauthorized user has accessed the mobile device.

16. The server of claim 14, wherein the operation of analyzing the derivative of the security notification data comprises:
generating an expected cryptogram using the data for the transaction; and
comparing the cryptogram to the expected cryptogram.

17. The server of claim 14, wherein the operation of analyzing the security notification data or the derivative of the security notification data further comprises:
determining a type of access by the unauthorized user from the security notification data or the derivative of the security notification data.

18. A method comprising:
receiving, by a server located remotely from a mobile device running a security software application, an authorization request message including data for a transaction and security notification data or a derivative of security notification data, in a form of a cryptogram, where the mobile device transmits the cryptogram to an access device by a short range antenna, and where the access device forwards the authorization request message to the server;
extracting, by the server, the security notification data or the derivative of the security notification data from the authorization request message;
analyzing, by the server, the security notification data or the derivative of the security notification data to determine that an unauthorized user has accessed the mobile device; and
generating, by the server, an authorization response message declining the transaction in order to prevent unauthorized access of data on the mobile device on a cellular phone network.

19. The method of claim 18, further comprising:
reporting, by the server, that the unauthorized user has accessed the mobile device.

20. The method of claim 18, wherein analyzing the derivative of the security notification data comprises:
generating an expected cryptogram using the data for the transaction; and
comparing the cryptogram to the expected cryptogram.

21. The method of claim 18, wherein analyzing the security notification data or the derivative of the security notification data further comprises:
determining a type of access by the unauthorized user from the security notification data or the derivative of the security notification data.

* * * * *